United States Patent
Chacko et al.

(10) Patent No.: US 10,403,443 B2
(45) Date of Patent: Sep. 3, 2019

(54) SOLID ELECTROLYTIC CAPACITOR WITH HIGH TEMPERATURE LEAKAGE STABILITY

(71) Applicant: KEMET Electronics Corporation, Simpsonville, SC (US)

(72) Inventors: Antony P. Chacko, Simpsonville, SC (US); Randolph S. Hahn, Simpsonville, SC (US); Pablo Antonio Ruiz, Simpsonville, SC (US)

(73) Assignee: KEMET Electronics Corporation, Simpsonville, SC (US)

( * ) Notice: Subject to any disclaimer, the term of this patent is extended or adjusted under 35 U.S.C. 154(b) by 254 days.

(21) Appl. No.: 14/871,402

(22) Filed: Sep. 30, 2015

(65) Prior Publication Data
US 2016/0020034 A1 Jan. 21, 2016

Related U.S. Application Data

(60) Division of application No. 14/063,205, filed on Oct. 25, 2013, now Pat. No. 9,362,056, which is a (Continued)

(51) Int. Cl.
*H01G 9/00* (2006.01)
*C25D 7/00* (2006.01)
(Continued)

(52) U.S. Cl.
CPC ............ *H01G 9/0032* (2013.01); *C25D 7/00* (2013.01); *C25D 11/26* (2013.01); *H01G 9/012* (2013.01);
(Continued)

(58) Field of Classification Search
CPC ...... H01G 9/025; H01G 9/0032; H01G 9/012; H01G 9/0025; H01G 9/048; H01G 9/15;
(Continued)

(56) References Cited

U.S. PATENT DOCUMENTS 3,491,269 A * 1/1970 Booe .................. H01G 9/08
361/539
4,794,491 A * 12/1988 Saiki .................. H01G 9/0425
361/532
(Continued)

FOREIGN PATENT DOCUMENTS

JP 2007227485 A * 9/2007 ............ H01G 9/042
WO WO-2006137482 A1 * 12/2006 ............ H01G 9/042

OTHER PUBLICATIONS

Gangolli, S., "Dictionary of Substances and Their Effects", 2005, Royal Society of Chemistry, p. 1.*
(Continued)

*Primary Examiner* — Gordon Baldwin
*Assistant Examiner* — Christina D McClure
(74) *Attorney, Agent, or Firm* — Joseph T. Guy; Patent Filing Specialist, Inc.

(57) ABSTRACT

A solid electrolytic capacitor and method for forming a solid electrolytic capacitor with high temperature leakage stability is described. The solid electrolytic capacitor has improved leakage current and is especially well suited for high temperature environments such as down-hole applications.

17 Claims, 4 Drawing Sheets

Related U.S. Application Data continuation-in-part of application No. 13/863,451, filed on Apr. 16, 2013, now Pat. No. 8,896,985, which is a division of application No. 12/972,917, filed on Dec. 20, 2010, now Pat. No. 8,503,165, which is a continuation-in-part of application No. 12/469,786, filed on May 21, 2009, now Pat. No. 8,310,816.

(60) Provisional application No. 61/718,847, filed on Oct. 26, 2012.

(51) Int. Cl.
| | |
|---|---|
| *C25D 11/26* | (2006.01) |
| *H01G 9/025* | (2006.01) |
| *H01G 9/048* | (2006.01) |
| *H01G 9/012* | (2006.01) |
| *H01G 9/15* | (2006.01) |
| *C25D 11/04* | (2006.01) |

(52) U.S. Cl.
CPC ............ *H01G 9/025* (2013.01); *H01G 9/048* (2013.01); *H01G 9/15* (2013.01); *C25D 11/04* (2013.01); *Y10T 29/417* (2015.01)

(58) Field of Classification Search
CPC .......... C25D 7/00; C25D 11/26; C25D 11/04; Y10T 29/417
USPC ............................................................ 427/79
See application file for complete search history.

(56) References Cited

U.S. PATENT DOCUMENTS

| | | | |
|---|---|---|---|
| 6,674,635 B1* | 1/2004 | Fife ................. | H01G 9/025 361/523 |
| 2006/0018084 A1* | 1/2006 | Saito ................ | H01G 9/012 361/523 |
| 2006/0209496 A1* | 9/2006 | Takatani ........... | H01G 9/0425 361/523 |
| 2007/0081301 A1* | 4/2007 | Tanaka ............. | H01G 2/065 361/540 |
| 2010/0039751 A1* | 2/2010 | Oohata ............. | H01G 9/042 361/523 |

OTHER PUBLICATIONS

Takahiro, JP-2007227485-A, Machine Translation, originally published 2007, p. 1-8 (Year: 2007).*

* cited by examiner

SOLID ELECTROLYTIC CAPACITOR WITH HIGH TEMPERATURE LEAKAGE STABILITY

CROSS-REFERENCE TO RELATED APPLICATIONS

The present application is a divisional application of U.S. patent application Ser. No. 14/063,205 filed Oct. 25, 2015 now U.S. Pat. No. 9,362,056 issued Jun. 7, 2016 which, in turn, claims priority to expired U.S. Provisional Application No. 61/718,847 filed 10/26/2012 which is incorporated herein by reference. U.S. patent application Ser. No. 14/063, 205 now U.S. Pat. No. 9,362,056 issued Jun. 7, 2016 is also a continuation-in-part of patented U.S. patent application Ser. No. 13/863,451 filed Apr. 16, 2013 now U.S. Pat. No. 8,896,985 issued Nov. 25, 2014 which is a divisional application of patented U.S. patent application Ser. No. 12/972, 917 filed Dec. 20, 2011 now US. Pat. No. 8,503,165 issued Aug. 6, 2013 which is, in turn, a continuation-in-part of patented U.S. patent application Ser. No. 12/469,786 filed May 21, 2009 now U.S. Pat. No. 8,310,816issued Nov. 13, 2012 all of which are incorporated herein.

BACKGROUND

The present invention is related to an improved method for preparing solid electrolytic capacitors with high temperature reliability.

The present invention is related to an improved method of forming a solid electrolyte capacitor and an improved capacitor formed thereby. More specifically, the present invention is related to a capacitor with improved long term leakage performance at 200° C. and above.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and to serve as the dielectric of the capacitor. The solid cathode electrolyte is typically chosen from a very limited class of materials, to include manganese dioxide or electrically conductive organic materials such as 7,7,8,8tetracyanoquinonedimethane (TCNQ) complex salt, or intrinsically conductive polymers, such as polyaniline, polypyrol, polythiophene and their derivatives. The solid cathode electrolyte is applied so that it covers the dielectric surfaces and is in direct intimate contact with the dielectric. In addition to the solid electrolyte, the cathodic layer of a solid electrolyte capacitor typically consists of several layers which are external to the anode body. In the case of surface mount constructions these layers typically include: a carbon layer; a cathode conductive layer which may be a layer containing a highly conductive metal, typically silver, bound in a polymer or resin matrix; and a conductive adhesive layer such as silver filled adhesive. The layers including the solid cathode electrolyte, conductive adhesive and layers there between are referred to collectively herein as the cathode layer which typically includes multiple layers designed to allow adhesion on one face to the dielectric and on the other face to the cathode lead. A highly conductive metal lead frame is used as a cathode lead for negative termination. The various layers connect the solid electrolyte to the outside circuit and also serves to protect the dielectric from thermomechanical damage that may occur during subsequent processing, board mounting, or customer use.

The cathodic conductive layer, which is typically a silver layer, serves to conduct current from the lead frame to the cathode and around the cathode to the sides not directly connected to the lead frame. The critical characteristics of this layer are high conductivity, adhesive strength to the carbon layer, wetting of the carbon layer, and acceptable mechanical properties.

The oldest, and currently largest, user of high-temperature electronics (>150° C.) is the downhole oil and gas industry (Analog Dialogue 46-04, April 2012). In this application, the operating temperature is a function of the underground depth of the well. Worldwide, the typical geothermal gradient is 25° C./km depth, but in some areas, it is greater. In the past, drilling operations have maxed out at temperatures of 150° C. to 175° C., but declining reserves of easily accessible natural resources coupled with advances in technology have motivated the industry to drill deeper, as well as in regions of the world with a higher geothermal gradient. Temperatures in these hostile wells can exceed 200° C., with pressures greater than 25 kpsi. Active cooling is not practical in this harsh environment, and passive cooling techniques are not effective when the heating is not confined to the electronics. Besides the oil and gas industries, other applications, such as avionics, are emerging for high-temperature electronics.

U.S. Pat. No. 7,233, 483, which is incorporated herein by reference, teaches a method for improving high temperature (85° C.) performance of capacitors wherein the cathode comprises a silver layer with the silver layer further comprising silver and/or sulfur compounds. The performance is inadequate for higher temperature applications.

US 2012/0106031, which is incorporated herein by reference, claims an improved capacitor assembly for use in high voltage and high temperature environments wherein the capacitor element is enclosed and hermetically sealed within a housing in the presence of a gaseous atmosphere that contains an inert gas. It is believed that the housing and inert gas atmosphere are capable of limiting the amount of oxygen and moisture supplied to the conductive polymer of the capacitor. In this manner, the solid electrolyte is less likely to undergo a reaction in high temperature environments, thus increasing the thermal stability of the capacitor assembly. Though capable of functioning at temperatures of about 215° C. or 230° C. this requires the capacitor to be in an environment which is void of moisture and air which is at least impractical if not impossible under typical working environments.

The prior art methods do not offer a solution for leakage degradation at high temperature such as 200° C. or above typically seen in an oil rig environment.

Thus there is a need for a solid electrolytic capacitor, and a method of making a solid electrolytic capacitor, which has good reliability when exposed to a temperature of 200° C. or above for 1000 hrs or the duration of intended application. A particular need is for a capacitor with a stable leakage and ESR at 200° C. or above.

SUMMARY

It is an object of the invention to provide an improved solid electrolytic capacitor.

It is an object of the invention to provide an improved method of preparing a solid electrolytic capacitor cathode.

Another object of the invention is to improve leakage stability of a capacitor at 200° C. or above by replacing a silver particle filled layer with a plated metal layer.

Another object of the invention is to improve leakage stability of a capacitor at 220° C. or above by replacing a silver particle filled layer with a plated metal layer.

Another object of the invention is to prepare solid electrolytic capacitors with an improved dielectric layer and a plated metal layer.

Another object of the invention is to prepare solid electrolytic capacitors with an carbon layer containing a high glass transition temperature binder and a plated metal layer.

Another object of the invention is to prepare solid electrolytic capacitors with a plated metal layer and an adhesive with high glass transition temperatures A particular advantage is provided by improving ESR stability on exposure to high temperature conditions.

These and other advantages, as will be realized, are provided in a solid electrolytic capacitor and a method for forming a solid electrolytic capacitor with high temperature leakage stability. The method includes: providing an anode; forming a dielectric on the anode; applying a cathode on the dielectric; applying a transition layer on the cathode wherein the transition layer comprises a blocking layer; plating a metal layer on the transition; and electrically connecting a cathode termination to the cathode wherein the solid electrolytic capacitor has a leakage of no more than 0.10 CV after 500 hrs at temperature of at least 200° C.

Yet another embodiment is provided in a solid electrolytic capacitor and a method for forming a solid electrolytic capacitor comprising: providing an anode; forming a dielectric on the anode; applying a cathode on the dielectric; applying a transition layer on said dielectric wherein said transition layer comprises a blocking layer; plating a metal layer on said transition layer; and electrically connecting a cathode termination to said cathode; wherein said solid electrolytic capacitor has a leakage shift of no more than 50% after 500 hrs at 200° C. relative to the leakage after 500 hours at ambient temperature.

DETAILED DESCRIPTION

It has now been surprisingly found that, significantly improved leakage stability at 200° C. and above can be obtained by replacing the polymeric silver coating layer with a plated metal layer or a metal deposited layer.

The present invention mitigates the deficiencies of the prior art by providing a capacitor with improved leakage current, particularly at high temperature, achieved by plated metal, and particularly plated nickel layers, and other optional layers.

The present invention will be described with reference to the various figures which illustrate, without limiting, the invention. Throughout the description similar elements will be numbered accordingly.

Figure 1:
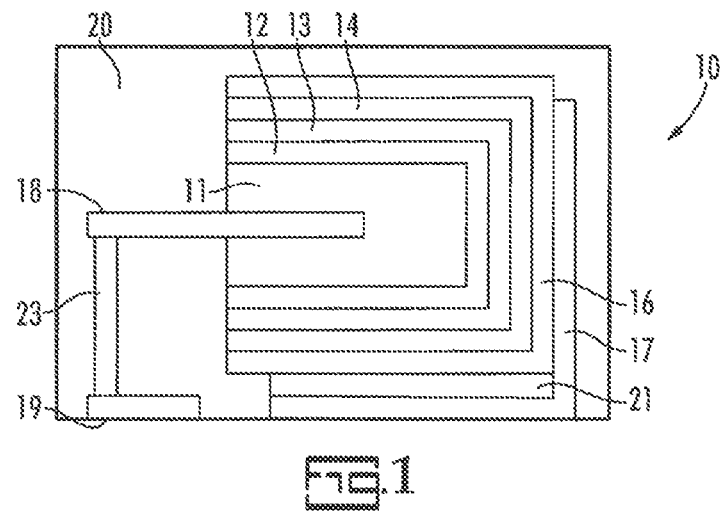
FIG. 1 is a cross-sectional schematic view of a capacitor.

FIG. 1 illustrates a cross-sectional schematic view of a capacitor generally represented at 10. The capacitor comprises an anode, 11, preferably comprising a valve metal as described further herein with an anode wire, 18, extending there from. A dielectric layer, 12, is provided on the surface of the anode, 11. Coated on the surface of the dielectric layer, 12, is a cathode layer, 13. A carbon layer, 14, and plated metal layer, 16, provide electrical conductivity and provide a surface which is more readily adhered to the cathode terminal, 17, than is the cathode layer, 13. The layers between the cathode, 13, and plated layer, 16, are referred to collectively herein as the transition layer which typically includes multiple layers designed to allow adhesion on one face to a polymeric cathode and on the other face to the plated layer, 16. An adhesive layer, 21, secures the cathode lead to the plated metal layer. The anode wire, 18, is electrically connected to the anode terminal, 19, by a connector, 23. The anode terminal and connector may be integral to a lead frame. The entire element, except for the terminus of the terminals, is then preferably encased in a non-conducting material, 20, such as an epoxy resin to form a hermetic seal.

In one embodiment the cathode comprises an improved transition layer. Included in the transition layer is a blocking layer, preferably selected from a hydrophobic layer and an insulative layer, which inhibits migration of metals and metal ions towards the dielectric. In a particularly preferred embodiment the blocking layer is between first and second carbon layers.

Figure 2:
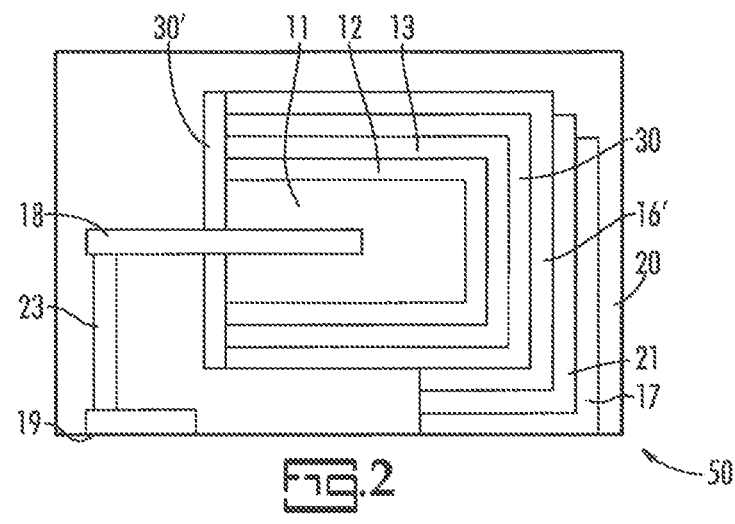
FIG. 2 is a cross-sectional schematic view of an embodiment of the invention.

A capacitor is illustrated schematically in FIG. 2 at 50. In FIG. 2 the anode, 11; dielectric, 12; cathode, 13; cathode termination, 17; anode wire, 18; anode termination, 19; and connector, 23, are as illustrated relative to FIG. 1. Layer 16' is a plated layer as will be more fully described herein. The transition layer, 30, comprises a blocking layer as will be more fully described herein. The transition layer preferably encases the entire underlying structure. A second optional transition layer, 30', which preferably comprises a second blocking layer, is preferably disposed on at least a portion of the surface of the underlying monolith from which the anode wire, 18, extends. The second blocking layer may be the same as the blocking layer of the transition layer but extended beyond the area of the transition layer. Alternatively, the second blocking layer may be a layer which is different from the blocking layer of the transition layer. The non-conducting material, 20, can be a non-conducting polymer which is capable of withstanding the operating conditions of intended use or it may be an inert material such as a ceramic material, a plastic material or a metal as exemplified in US 2012/0106031 or combinations thereof.

The function of blocking layer of the transition layer is to electrically connect the cathode, 13, to the plated metal layer, 16', while inhibiting metal and metal ions from migrating there through. One surface of the transition layer must be compatible with the cathode layer and the opposing surface must be compatible with the cathode termination or an adhesion layer attaching the transition layer to the cathode termination. To accomplish these tasks the transition layer is typically a multiplicity of layers preferably starting with a carbon based layer, for adhesion directly to the cathode and subsequent adhesion to metal layers, followed by metal layers for adhesion to the carbon and cathode termination or adhesive layer with the blocking layer included therein.

Figure 3:
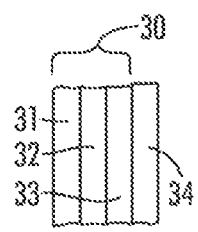
FIG. 3 is a partial cross-sectional schematic view of a preferred transition layer of the present invention.

An embodiment of the transition layer is illustrated in FIG. 3 wherein a cross-sectional portion of the transition layer, 30, and plated metal layer, 34, is shown in isolation. A preferred transition layer comprises a first carbon layer, 31, which is formulated to adhere adequately to the cathode while still having adequate conductivity through the layer. A blocking layer, 32, is provided which inhibits the metal ion in the electroplating electrolyte from migrating into or through the blocking layer. It is preferred that no metal migrates through the blocking layer. In practice, minute amounts may migrate which is undesirable but acceptable. The blocking layer will be described more thoroughly herein. A second carbon layer, 33, is formulated to provide adhesion to the blocking layer and to the plated metal layer, 34. The plated metal layer, 34, is the eventual contact point within a circuit and is electrically connected to a cathode lead or to a circuit trace preferably by a conductive adhesive. The blocking layer is preferably between two carbon layers since this provides maximum adhesion. The blocking layer could be between a carbon layer and a metal layer or between the cathode and a carbon layer. In an alternative embodiment the carbon layer may be a blocking layer. The blocking layer is preferably a hydrophobic layer or an electrically insulative layer.

Figure 4:
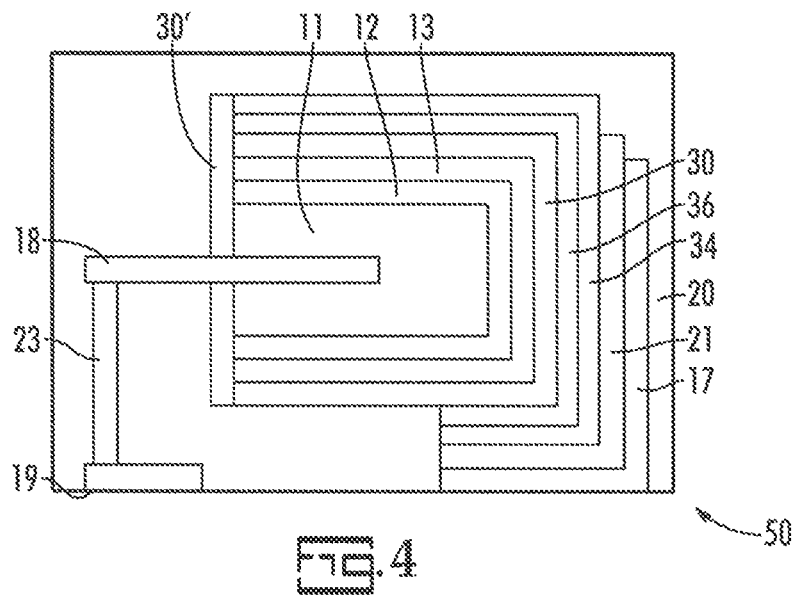
FIG. 4 is a partial cross-sectional view of an embodiment of the present invention.

An embodiment of the present invention is illustrated schematically in FIG. 4 at 50. In FIG. 4 the anode, 11; dielectric, 12; cathode, 13; cathode termination, 17; anode wire, 18; anode termination, 19; non-conducting material, 20; and connector, 23, are as illustrated relative to FIG. 1. A metal filled layer, 36, preferably a silver filled layer, is on the transition layer, 30, and a plated metal layer, 34, is on the metal filled layer.

Figure 5:
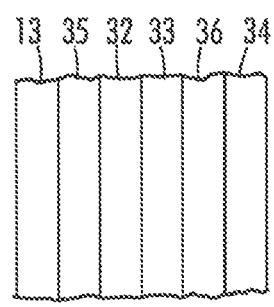
FIG. 5 is a partial cross-sectional view of an embodiment of the present invention.

An embodiment of the invention is illustrated in FIG. 5 wherein a cross-sectional portion with the cathode, 13, plated metal layer, 34, and layers there between shown in isolation. In the embodiment of FIG. 5 a first carbon layer, 35, is in contact with the cathode and the layer is formulated to adhere adequately to the cathode while still having adequate conductivity through the layer. A blocking layer, 32, inhibits the metal ion in the electroplating electrolyte from migrating into or through the blocking layer. A second carbon layer, 33, is formulated to provide adhesion to the blocking layer and to the optional metal filled layer, 36. A plated metal layer, 34, is on the metal filled layer or in the absence thereof the second carbon layer. The plated metal layer, 34, is the eventual contact point within a circuit and is electrically connected to a cathode lead or to a circuit trace preferably by a conductive adhesive. In one embodiment there is no metal filled layer.

Figure 6:
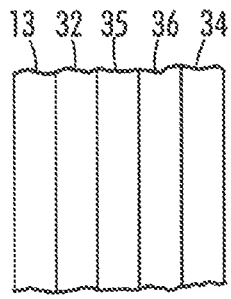
FIG. 6 is a partial cross-sectional view of an embodiment of the present invention.
Figure 7:
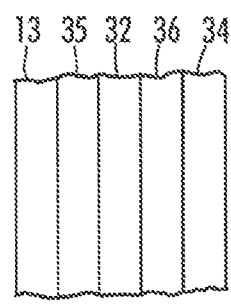
FIG. 7 is a partial cross-sectional view of an embodiment of the present invention.

Another embodiment of the invention is illustrated in FIG. 6 wherein a cross-sectional portion with the cathode, 13, plated metal layer, 34, and layers there between shown in isolation. In FIG. 6 the blocking layer, 32, is between the cathode, 13, and the carbon layer, 35. This embodiment has the advantage of requiring one less layer. A related embodiment is illustrated in FIG. 7 wherein the blocking layer, 32, is between the carbon layer, 35, and an optional metal filled layer, 36.

Figure 8:
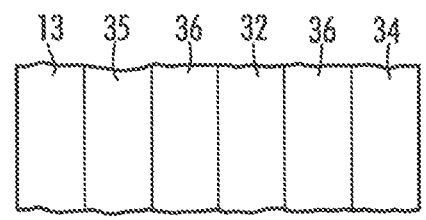
FIG. 8 is a partial cross-sectional view of an embodiment of the present invention.

Another embodiment of the invention is illustrated in FIG. 8. In FIG. 8, a carbon layer, 35, is on the cathode, 13.

Optional metal filled layers, 31, sandwich a blocking layer, 32, and a plated metal layer, 34, is on the outermost metal filled layer.

The cathode layer is a conductive layer preferably comprising conductive polymer, such as polythiophene, polyaniline, polypyrrole or their derivatives; manganese dioxide, lead oxide or combinations thereof.

A particularly preferred conducting polymer is illustrated in Formula I:

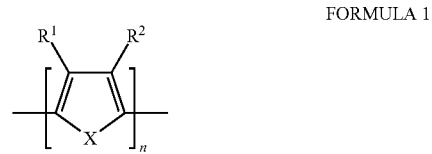

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates: A particularly preferred polymer is 3,4-polyethylene dioxythiophene (PEDT). The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

The manganese dioxide layer is preferably obtained by immersing an anode element in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

The first carbon layer and second carbon layer, which may be the same or different, each comprises a conductive composition comprising resin and conductive carbon particles. Each carbon layer may individually also comprise adjuvants such as crosslinking additives, surfactants and dispersing agents. The resin, conductive carbon particles and adjuvants are preferably dispersed in an organic solvent or water to form a coating solution. The solvent and resin for the first conductive carbon layer needs to have good wettability to the semi-conductive cathode surface.

The blocking layer is most preferably less than two microns thick. Above about two microns the resistivity of the layer exceeds acceptable limits thereby defeating one of the purposes of the transition layers. The lower limit of thickness is set by the coating technique with a monolayer on the entire surface being the theoretical limit. This theoretical limit is difficult to reach with most coating techniques due to the presence of surface vacancies wherein the blocking properties are compromised. Since the blocking layer is a poorly conducting layer its presence necessarily increases resistance between the cathode and cathode lead which is undesirable. Surprisingly, the increased adhesion provides sufficient interlayer stability to mitigate the detrimental impact of the increased resistance.

The hydrophobic coating preferably comprises hydrophobic polymers. Silicone and their copolymers, fluorinated polymers and their copolymers are mentioned as being particularly preferred. The hydrophobic layer may include fillers such as silica. Nanoclay and related materials modified with a hydrophobic coating is particularly suitable for demonstration of the invention. The hydrophobic coating is preferably a thermoset coating with high cross link density. The hydrophobic coating is chosen such that the plating electrolyte has very low wettability to the coated surface. In addition to providing low wettability the high cross link density prevents diffusion of plating electrolyte through this coating layer.

A second carbon layer is preferably applied over the blocking layer. Since the blocking layer is designed to have low wettability to aqueous based systems, a water based carbon coating has very low adhesion to this surface. A solvent based carbon coating is preferred for this application. The solvent and resin of the carbon coating is chosen such that the coating can adequately wet the blocking layer which is typically a hydrophobic surface. In addition to wetting, the binder of the second carbon coating needs to have strong adhesion to the binder in the blocking layer as well as to the metal layer. The second carbon coating is preferably highly conductive to enable a faster rate of plating of the metal layer. In addition to the carbon particles such as graphite, carbon black, carbon nanotubes, graphene, metal particles can also be added to improve conductivity.

Preferred resins for the carbon layers are polymers of materials selected from the group phenolic, phenoxy, epoxy, acrylic, cellulose derivatives, aromatic cyanate esters, diallyl isophthalate, bismaleimide, polyimides, polyamide imides, polysulfones, polyphylenes, polyether sulfones, polyaryl ethers, polyphenylene sulfides, polyarylene ether ketones, polyether imides, polyquinoxalines, polyquinolines, polybenzimidazoles, polybenzoxazoles, polybenzothiazoles, and silicones such as silicone polyester and silicone epoxy. More preferably the resin is selected from cellulose derivatives, acrylic, polyester, aromatic cyanate ester, epoxy, phenolic, diallyl isophthalate, phenoxy, polyimide and bismaleimide.

The components of the cathode layer, including the transition layer, preferable has a high thermal decomposition temperature and preferably at least 350° C. More preferably the cathode layer, including the transition layer, preferable has a high thermal decomposition temperature and preferably at least 500° C.

The plated metal layer may be applied to the second carbon coating. Plating can be done with various metallic systems. Nickel is a preferred metal system. Plating can be done either by electroplating or electroless plating. Electroplating is preferred due to the lower production cycle time. Conductive adhesive is typically used to adhesively attach the metal layer to the lead frame which acts as the cathode lead or to a circuit trace.

Figure 9:
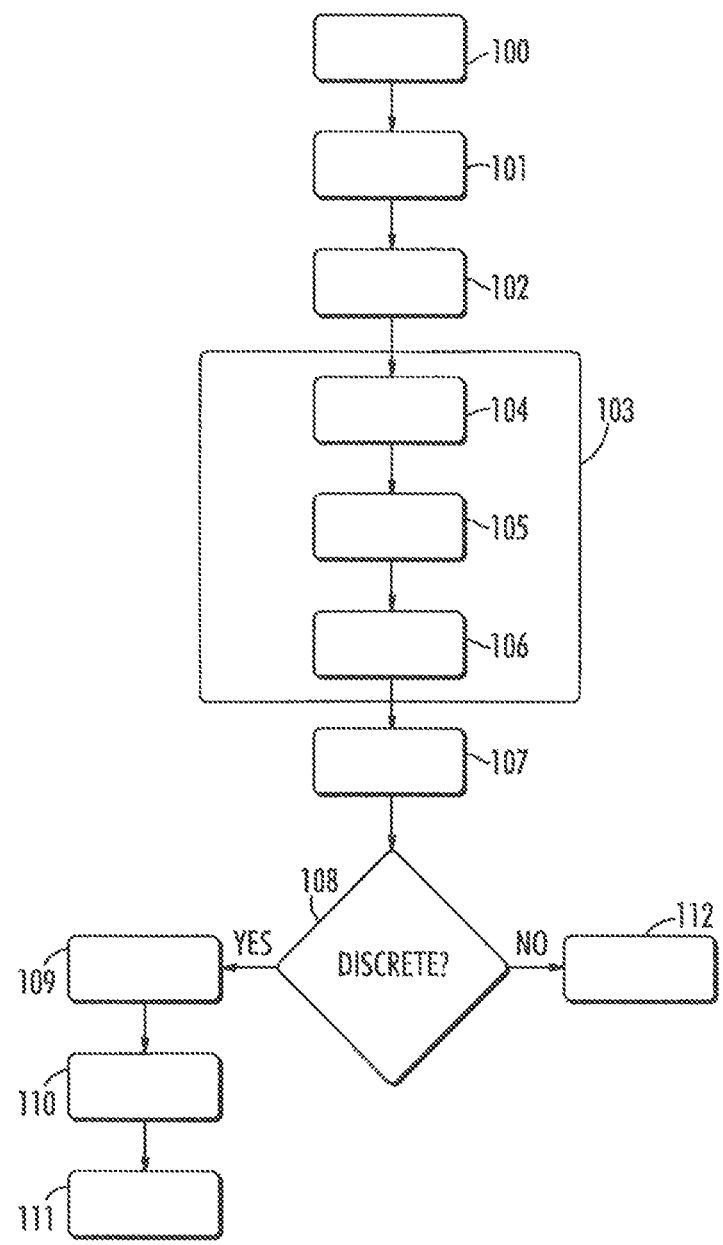
FIG. 9 is a schematic illustration of an embodiment of the present invention.

A preferred process for forming the capacitor is illustrated in FIG. 9.

In FIG. 9, the anode is formed, 100, preferably from a valve metal as described further herein.

The anode is a conductor preferably selected from a valve metal or a conductive metal oxide. More preferably the anode comprises a valve metal, a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. Conductive polymeric materials may be employed as an anode material. Particularly preferred conductive polymers include polypyrrole, polyaniline and polythiophene. Aluminum is typically employed as a foil while tantalum is typically prepared by pressing tantalum powder and sintering to form a compact. For convenience in handling, the valve metal is typically attached to a carrier thereby allowing large numbers of elements to be processed at the same time.

The anode is preferably etched to increase the surface area particularly if the anode is a valve metal foil such as aluminum foil. Etching is preferably done by immersing the anode into at least one etching bath. Various etching baths are taught in the art and the method used for etching the anode is not limited herein.

The anode wire is preferably attached to the anode, particularly when a compact is employed. The anode wire can be attached by welding or by embedding into the powder prior to pressing. A valve metal is a particularly suitable anode wire and in a preferred embodiment the anode and anode wire are the same material.

A dielectric is formed, 101, on the surface of the anode. The dielectric is a non-conductive layer which is not particularly limited herein. The dielectric may be a metal oxide or a ceramic material. A particularly preferred dielectric is the oxide of a metal anode due to the simplicity of formation and ease of use. The dielectric layer is preferably an oxide of the valve metal as further described herein. It is most desirable that the dielectric layer be an oxide of the anode.

The dielectric is preferably formed by dipping the anode into an electrolyte solution and applying a positive voltage to the anode. Electrolytes for the oxide formation are not particularly limiting herein but exemplary materials can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the dielectric on the anode including aqueous solutions of dicarboxylic acids, such as ammonium adipate are also known. Other materials may be incorporated into the dielectric such as phosphates, citrates, etc. to impart thermal stability or chemical or hydration resistance to the dielectric layer.

A conductive layer is formed, 102, on the surface of the dielectric. The conductive layer acts as the cathode of the capacitor. The cathode is a conductor preferably comprising at least one conductive material selected from manganese dioxide and a conductive polymeric material. Particularly preferred conductive polymers include polypyrrole, polyaniline and polythiophene. Metals can be employed as a cathode material with valve metals being less preferred.

After conductive cathode layer formation, 102, a transition layer may be applied, 103, by spraying or dipping. In one embodiment a first carbon layer is applied, 104. A blocking layer is applied, 105, by spraying or dipping. After blocking layer formation a second carbon layer can be applied, 106, by spraying or dipping.

A metal plated layer is formed, 107, preferably by electroplating or electroless plating. A particularly preferred metal plated layer is nickel.

The capacitor may be a discrete capacitor or an embedded capacitor. If a discrete capacitor is to be formed, at 108, a conductive adhesive is added, 109, and the metal layer is adhered to a cathode lead, 110. The capacitor is finished, 111, which may include incorporating anode and cathode terminals, external insulation, testing, packing and the like as known in the art.

If the capacitors are to be employed in an embedded application or attached directly to a circuit trace the capacitors are finished, 112, which may include testing, packing and the like.

The capacitor is illustrated herein as a discrete capacitor for convenience and this is a preferred embodiment. In another preferred embodiment the anode wire and metal layer, of the transition layer, may be in direct electrical contact with a circuit trace wherein elements of the circuit may constitute the cathode lead, anode lead or both. In another preferred embodiment the capacitor may be embedded in a substrate or incorporated into an electrical component with additional functionality.

A metal plated layer comprising nickel is particularly advantageous, with or without a blocking layer. The metal plated layer provides a capacitor with a particularly high reliability, particularly at temperatures above 200° C. A particularly preferred metal plating layer consists essentially of nickel. It is particularly preferred that the metal plated layer does not contain either sulfur or silver.

A metal filled layer is defined herein as a layer comprising metal in an organic matrix.

The present invention provides a solid electrolytic capacitor with a leakage current of no more than 0.10 CV after treatment for 500 hrs at a temperature of at least 200° C. More preferably the solid electrolytic capacitor with a leakage current of no more than 0.05 CV after treatment for 500 hrs at a temperature of at least 200° C. Even more preferably, the solid electrolytic capacitor with a leakage current of no more than 0.10 CV after treatment for 500 hrs at a temperature of at least 200° C. The present invention also provides a solid electrolytic capacitor with a leakage current of no more than 0.10 CV after treatment for 500 hrs at a temperature of at least 220° C. More preferably the solid electrolytic capacitor with a leakage current of no more than 0.05 CV after treatment for 500 hrs at a temperature of at least 220° C. Even more preferably, the solid electrolytic capacitor with a leakage current of no more than 0.01 CV after treatment for 500 hrs at a temperature of at least 220° C.

EXAMPLES

Example 1

A series of identical tantalum anodes were prepared. The tantalum was anodized to form a dielectric on the tantalum anode in identical fashion. In one set of samples a manganese dioxide cathode was formed on the dielectric with first carbon layer comprising graphite dispersion in acrylic solution was applied. The capacitors with manganese dioxide cathodes were split into three groups. In a first control group a nickel plated layer was formed on the first carbon. In the second control group a silver layer was formed on the first carbon. In the inventive group a hydrophobic coating comprising silicone polymer solution was applied on the first carbon layer. A second carbon layer comprising a mixture of carbon black and graphite dispersion in a polyester binder was applied on the hydrophobic layer. A nickel plated layer was formed on the second carbon by electroplating. Both control and inventive samples were dried and electrical properties were measured at room temperature. The results are presented in Table 1.

TABLE 1

|  | Leakage (microamps) | ESR (mohms) |
| --- | --- | --- |
| Plated Layer | 536 | 115 |
| Silver Layer | 1.3 | 57.6 |
| Inventive | 1.25 | 42.8 |

Table 1 clearly illustrates the advantages of the present invention, particularly, with regards to a decrease in leakage current and ESR.

Example 2

On an identical set of samples a polymeric cathode was formed utilizing polyethylenedioxythiophene (PEDT) with carbon layers applied thereto respectively. The capacitors with PEDT cathodes were split into three groups. In a control group a nickel plated layer was formed on a first carbon layer comprising a carbon black and graphite dispersion in a polyester binder solution was applied. In the second control group, a carbon and silver layer was applied on a PEDT cathode. In the inventive group a hydrophobic coating comprising a silicone polymer solution was applied on the first carbon layer. A second carbon layer similar to the second carbon layer of Example 1 was applied on the hydrophobic layer. A nickel plated layer was formed on the second carbon by electroplating. Both control and inventive samples were dried and electrical properties were measured at room temperature. The results are provided in Table 2.

TABLE 2

|  | Leakage (microamp) | ESR (mohms) |
|---|---|---|
| Plated Layer | 312.5 | 41.93 |
| Silver Layer | 3.01 | 47.6 |
| Inventive | 0.95 | 66.5 |

Table 2 clearly illustrates the advantages offered by the present invention, particularly, with regards to leakage current.

Example 3

On an identical set of samples a polymeric cathode was formed utilizing polyethylenedioxythiophene (PEDT) polymers. The capacitors with PEDT cathodes were split into three groups. In the first control group a carbon layer was applied on PEDT followed with nickel plating. In a second control group a carbon and silver layer was applied on the PEDT cathode. In the inventive group, a hydrophobic layer comprising silicone polymer solution was applied on the PEDT cathode. No carbon layer was applied in the inventive group. A nickel plated layer was formed on the hydrophobic layer by electroplating.

Both control and inventive samples were dried and electrical properties were measured at room temperature. The results are provided in Table 3.

TABLE 3

|  | Leakage (microamps) | ESR (mohms) |
|---|---|---|
| Plated Layer | 85.44 | 18.98 |
| Silver Layer | 5.108 | 22.8 |
| Inventive | 2.67 | 19.3 |

Table 3 clearly illustrates the advantages offered by the present invention, particularly, with regards to leakage current and ESR.

The invention has been described with particular emphasis on the preferred embodiments. One of skill in the art would realize additional embodiments, alterations, and advances which, though not enumerated, are within the invention as set forth more specifically in the claims appended hereto.

Comparative Example 4

A series of tantalum anodes (100 microfarad, 16V) using two different sets of anodes was prepared. The tantalum was anodized to form a dielectric on the tantalum anode. A cathode layer was applied followed by a silver layer. Parts thus prepared were exposed to 200° C. for several hours to determine the leakage stability at 200° C. After 500 hours at 200° C. the comparative examples exhibited a leakage over about 4 CV with average leakage of about 16 CV with leakage of about 100 CV observed.

Inventive Example 5

A series of tantalum anodes (100 microfarad, 16V) using two different sets of anodes was prepared. The tantalum was anodized to form a dielectric on the tantalum anode. A MnO$_2$ cathode layer was applied. These parts were plated with Nickel. Parts thus prepared were exposed to 200° C. for several hours to determine the leakage stability at 200° C. The leakage was essentially unchanged with treatment for up to 1000 hours.

Inventive Example 6

A series of tantalum anodes (220 microfarad, 10V) using two different sets of anodes was prepared. The tantalum was anodized to form a dielectric on the tantalum anode. A MnO$_2$ cathode layer was applied. These parts were plated with nickel, assembled and encapsulated. Case dimensions were 7.3 mm (length), 4.3 mm (width), and 4.0 mm (height). Parts thus prepared were exposed to 220° C. for 1000 hrs hours to determine the leakage stability at 220° C. as illustrated in FIG. 8. The leakage was unchanged after 1000 hours of treatment which is a leakage shift of less then 50% and less than 20% whereas a control sample exhibited leakages in excess of 500 microamps for a significant portion of the samples tested which is a shift of in excess of 50%.

Test Methods: CV is defined as the multiplicative product of capacitance and voltage, where capacitance is measured at 120 Hz at rated voltage (V).

The invention claimed is:

1. A method for forming a solid electrolytic capacitor comprising:
   providing an anode;
   forming a dielectric layer on said anode;
   applying a cathode layer on said dielectric layer;
   applying a transition layer on said cathode layer wherein said transition layer comprises a blocking layer wherein said blocking layer is hydrophobic and insulative;
   plating a metal layer on said transition layer; and
   electrically connecting a cathode termination to said cathode layer;
   wherein said solid electrolytic capacitor has a leakage shift of no more than 50% after 500 hrs at 200° C. relative to the leakage after 500 hours at ambient temperature.

2. The method for forming a solid electrolytic capacitor of claim 1 wherein said solid electrolytic capacitor has a leakage shift of no more than 50% after 500hrs at 220° C. relative to the leakage after 500 hours at ambient temperature.

3. The method for forming a solid electrolytic capacitor of claim 1 wherein the median leakage shift at 200° C. for 500 hrs is less than 20% relative to the leakage after 500 hours at ambient temperature.

4. The method for forming a solid electrolytic capacitor of claim 1 wherein said solid electrolytic capacitor has a leakage of no more than 0.10 CV after 500 hrs at a temperature of at least 200° C.

5. The method for forming a solid electrolytic capacitor of claim 1 wherein said capacitor has a leakage of no more than 0.10 CV after 500 hrs at temperature greater than 220° C.

6. The method for forming a solid electrolytic capacitor of claim 1 wherein said metal layer does not contain silver or sulfur.

7. The method for forming a solid electrolytic capacitor of claim 1 wherein said plating a metal layer comprises plating a layer comprising nickel.

8. The method for forming a solid electrolytic capacitor of claim 7 wherein said plating a metal layer comprises plating a layer consisting essentially of nickel.

9. The method for forming a solid electrolytic capacitor of claim 1 wherein said cathode layer is MnO$_2$.

10. The method for forming a solid electrolytic capacitor of claim 1 wherein said cathode layer has a thermal decomposition temperature of greater than 350° C.

11. The method for forming a solid electrolytic capacitor of claim 10 wherein said thermal decomposition temperature is greater than 500° C.

12. The method for forming a solid electrolytic capacitor of claim 1 wherein said capacitor is encapsulated.

13. The method for forming a solid electrolytic capacitor of claim 12 wherein said capacitor is encapsulated in a material selected from polymer, metal and ceramic.

14. The method for forming a solid electrolytic capacitor of claim 12 wherein said capacitor is encapsulated in a hermetic seal.

15. The method for forming a solid electrolytic capacitor of claim 12 wherein said capacitor is encapsulated in a material which does not form a hermetic seal.

16. The method for forming a solid electrolytic capacitor of claim 1 wherein said blocking layer has a thickness of less than 2 microns.

17. The method for forming a capacitor of claim 1 wherein said plating a metal layer is done by electroplating.

* * * * *